(12) United States Patent
Burton et al.

(10) Patent No.: US 6,225,427 B1
(45) Date of Patent: May 1, 2001

(54) OLEFIN POLYMERIZATION PROCESS EMPLOYING METALLOCENE CATALYST PROVIDED BY COCATALYST ACTIVATION OF A METALLOCENE PROCATALYST

(75) Inventors: Willie C. Burton, Naugatuck; Xu Wu Feng, Bethany, both of CT (US); Daniel Gillis, Claymont, DE (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 09/173,396

(22) Filed: Oct. 15, 1998

(51) Int. Cl.$^7$ .......................... C08F 4/646; C08F 210/18
(52) U.S. Cl. .......................... 526/160; 526/127; 526/132; 526/133; 526/152; 526/153; 526/156; 526/165; 526/336; 526/348; 502/124; 502/128; 502/129; 502/132
(58) Field of Search .................................. 502/152, 154, 502/155, 123, 124, 128, 129, 132; 526/132, 133, 160, 165, 127, 152, 153, 156, 336, 348

(56) References Cited

U.S. PATENT DOCUMENTS

| | | |
|---|---|---|
| 4,752,597 | 6/1988 | Turner . |
| 4,871,705 | 10/1989 | Hoel . |
| 4,892,851 | 1/1990 | Ewen et al. . |
| 4,931,417 | 6/1990 | Miya et al. . |
| 4,931,517 | 6/1990 | Fujita . |
| 4,933,403 | 6/1990 | Kaminsky et al. . |
| 5,001,205 | 3/1991 | Hoel . |
| 5,017,714 | 5/1991 | Welborn, Jr. . |
| 5,026,798 | 6/1991 | Canich . |
| 5,034,549 | 7/1991 | Piotrowski et al. . |
| 5,036,034 | 7/1991 | Ewen . |
| 5,055,438 | 10/1991 | Canich . |
| 5,064,802 | 11/1991 | Stevens et al. . |
| 5,086,134 | 2/1992 | Antberg et al. . |
| 5,087,677 | 2/1992 | Brekner et al. . |
| 5,126,301 | 6/1992 | Tsutsui et al. . |
| 5,126,303 | 6/1992 | Resconi et al. . |
| 5,132,262 | 7/1992 | Rieger et al. . |
| 5,132,380 | 7/1992 | Stevens et al. . |
| 5,132,391 | 7/1992 | Winter et al. . |
| 5,145,819 | 9/1992 | Winter et al. . |
| 5,153,157 | 10/1992 | Hlatky et al. . |
| 5,155,080 | 10/1992 | Elder et al. . |
| 5,225,501 | 7/1993 | Fujita et al. . |
| 5,227,440 | 7/1993 | Canich et al. . |
| 5,227,478 | 7/1993 | Koch . |
| 5,229,478 | 7/1993 | Floyd et al. . |
| 5,241,025 | 8/1993 | Hlatky et al. . |
| 5,243,002 | 9/1993 | Razavi . |
| 5,278,119 | 1/1994 | Turner et al. . |
| 5,278,265 | 1/1994 | Razavi . |
| 5,281,679 | 1/1994 | Jejelowo et al. . |
| 5,296,434 | 3/1994 | Karl et al. . |
| 5,304,614 | 4/1994 | Winter et al. . |
| 5,308,817 | 5/1994 | Reddy et al. . |
| 5,324,800 | 6/1994 | Welborn, Jr. et al. . |
| 5,328,969 | 7/1994 | Winter et al. . |
| 5,329,031 | 7/1994 | Miyake et al. . |
| 5,330,948 | 7/1994 | Marks et al. . |
| 5,331,057 | 7/1994 | Brekner et al. . |
| 5,349,032 | 9/1994 | Miyake et al. . |
| 5,369,196 | 11/1994 | Matsumoto et al. . |
| 5,372,980 | 12/1994 | Davis . |
| 5,374,753 | 12/1994 | Yamada et al. . |
| 5,384,299 | 1/1995 | Turner et al. . |
| 5,385,877 | 1/1995 | Fujita et al. . |
| 5,391,629 | 2/1995 | Turner et al. . |
| 5,391,789 | 2/1995 | Rohrmann . |
| 5,399,636 | 3/1995 | Alt et al. . |
| 5,401,817 | 3/1995 | Palackal et al. . |
| 5,406,013 | 4/1995 | Patsidis et al. . |
| 5,416,177 | 5/1995 | Siedle et al. . |
| 5,416,178 | 5/1995 | Winter et al. . |
| 5,416,228 | 5/1995 | Ewen et al. . |
| 5,427,991 | 6/1995 | Turner . |
| 5,434,115 | 7/1995 | Yamada et al. . |
| 5,436,305 | 7/1995 | Alt et al. . |
| 5,439,994 | 8/1995 | Inoue et al. . |
| 5,441,920 | 8/1995 | Welborn, Jr. . |
| 5,442,020 | 8/1995 | Davis . |
| 5,449,651 | 9/1995 | Reddy et al. . |
| 5,453,410 | 9/1995 | Kolthammer et al. . |
| 5,455,365 | 10/1995 | Winter et al. . |
| 5,455,366 | 10/1995 | Rohrmann et al. . |
| 5,459,117 | 10/1995 | Ewen . |
| 5,466,649 | 11/1995 | Jejelowo . |
| 5,470,811 | 11/1995 | Jejelowo et al. . |
| 5,491,205 | 2/1996 | Langhauser et al. . |
| 5,491,207 | 2/1996 | Hoel . |
| 5,519,100 | 5/1996 | Ewen et al. . |
| 5,561,092 | 10/1996 | Ewen et al. . |
| 5,614,457 | 3/1997 | Ewen et al. . |
| 5,786,433 | * 7/1998 | Tomotsu et al. .................. 526/133 X |
| 5,942,589 | * 8/1999 | Wunsch et al. ...................... 526/346 |

FOREIGN PATENT DOCUMENTS

| | | |
|---|---|---|
| 0347129 | 12/1989 | (EP) . |
| 0575875 | 12/1993 | (EP) . |
| 0593083 | 4/1994 | (EP) . |
| 0612769 | 8/1994 | (EP) . |
| 0632066 | 1/1995 | (EP) . |
| 0643079 | 3/1995 | (EP) . |
| 0653445 | 5/1995 | (EP) . |

\* cited by examiner

Primary Examiner—Fred Teskin
(74) Attorney, Agent, or Firm—Raymond D. Thompson

(57) ABSTRACT

A polyolefin elastomer possessing a unique combination of properties, i.e., high molecular weight ($M_w$), high Mooney viscosity ($ML_{1+4}$ at 125° C.), low polydispersity index ($M_w/M_n$) and low glass transition temperature ($T_g$), is obtained by a polymerization process employing a particular type of a metallocene catalyst. The polyolefin elastomer is useful for manufacturing a variety of products including rubber articles such as hoses, belts and moldings, polymer blends containing one or more other hydrocarbon polymers and lubricating oils in which the elastomer functions as a viscosity modifier. Also disclosed is a cocatalyst for activating the metallocene procatalyst employing a specific molar ratio of the components of the cocatalyst to the transition metal of the procatalyst.

36 Claims, No Drawings

OLEFIN POLYMERIZATION PROCESS EMPLOYING METALLOCENE CATALYST PROVIDED BY COCATALYST ACTIVATION OF A METALLOCENE PROCATALYST

BACKGROUND OF THE INVENTION

This invention relates to a process for the polymerization of olefins employing a metallocene catalyst and to a cocatalyst for activating a metallocene procatalyst to provide the metallocene catalyst.

The most common polyolefin elastomers produced today are copolymers of ethylene and propylene (EP) and terpolymers of ethylene, propylene and a diene (EPDM). Ordinary EP elastomers can be cured using such curatives as organic peroxides, while the use of sulfur as a curative requires the incorporation of a diene. EPDM elastomers are usually produced with vanadium-organoaluminum catalysts, i.e., Ziegler-Natta catalysts.

Along with the better known EP and EPDM polymers, co- and terpolymers incorporating other α-olefins in place of propylene such as 1-butene, 1-pentene, 1-hexene, styrene, and combinations thereof are also known. EPDMs are representative of the more general category of ethylene-α-olefin diene elastomers (EODEs). Of the EODEs, EPDMs have achieved particular prominence due to the many properties which make them desirable for applications requiring good weather and acid resistance and high and low temperature performance. Notable applications of the EPDMs include their use in such products as hoses, gaskets, power transmission belts, conveyor belts, bumpers, automotive extrusions and moldings, weather stripping, blending components for plastics and rubbers such as polypropylene, polystyrene and butyl rubber, fabric coatings, viscosity modifiers for lubrication oils, tire sidewalls and in roofing and other membrane applications, shoe soles and heels and many other rubber articles. Another noteworthy application of the EPDMs is in wire and cable insulation due to their excellent dielectric properties.

It is desirable for an EPDM to have a reasonably fast cure rate and high state of cure, requirements calling for a relatively high diene content, e.g., three percent or higher. The cure rate for an EPDM elastomer and the final properties of the cured article depend upon the type of diene incorporated. For example, on a comparable diene weight percent basis, an EPDM produced with 5-ethylidiene-2-norbornene (ENB) as the diene will have a faster cure rate using a sulfur cure than would an EPDM containing dicyclopentadiene (DCPD) or 1,4-hexadiene (HD).

As for the properties of cured EPDM, EPDMs made with hexadiene as the termonomer are known to exhibit good heat resistance. For most commercial elastomer applications, the EPDM should have a weight-average molecular weight ($M_w$) of at least about 300,000, or $ML_{1+4}$ at 125° C. of at least about 20 when expressed in terms of Mooney viscosity. In many applications, it is further desirable that the molecular weight distribution (MWD) of an EPDM be characterized by a ratio of weight average molecular weight to number average molecular weight ($M_w/M_n$), i.e., polydispersity index, of not greater than about 7 and preferably not greater than about 5.

The properties of an EPDM elastomer such as its tensile strength, processability and tack can be related to its degree of crystallinity. Since in most commercial uses elastomers are higher in molecular weight than plastics, too high a degree of crystallinity can make an EPDM difficult to process at ordinary temperatures. Although good physical properties are desirable, especially in such applications as hose, tubing, wire and cable, excessive crystallinity can cause an EPDM to exhibit high hardness and stiffness resulting in a "plastic" rather than a "rubber" surface with poor surface tack.

In general, commercially useful plastics, which are homo- and copolymers of ethylene, propylene, and higher α-olefins, need not have as high a molecular weight as commercially useful elastomers of ethylene-α-olefins such as EPDM. In terms of the catalysts used for each, when producing copolymers with compositions of $M_w$ in the elastomer range, catalysts that provide high $M_w$ plastic copolymers may produce low $M_w$ polymers unsuitable for elastomer applications. Similarly, undesirable MWD changes can occur or the compositional distribution can change. Thus, catalyst performance for the production of plastics is not indicative of catalyst performance for the production of elastomers.

In most current EPDM production, the catalysts conventionally employed in the production of high molecular weight EPDM elastomers are soluble vanadium catalysts such as $VCl_4$, $VOCl_3$, $VO(Ac)_3$ or $VO(OR)_3$ where R is an alkyl group together with an organoaluminum compound. The activity of the vanadium catalysts are relatively low, e.g., producing 5–20 kg polymer/g vanadium.

In current commercial grades of EPDM, crystallinity is a function of both the ethylene content of the polymer and the catalyst system used for its production. For a given polymer composition, the catalyst system controls the fraction of ethylene units present in long ethylene sequences which are capable of crystallizing. With any given catalyst and reactor configuration, polymers with higher ethylene content will have longer ethylene sequences and be more crystalline.

In current EPDM production based on vanadium catalysts, the product EPDM polymers are completely amorphous (non-crystalline) at ethylene contents below about 55 wt %. Conversely, at ethylene contents of about 55 wt % or greater, an EPDM will possess significant crystallinity. The degree of crystallinity depends less on the diene content of the EPDM than on the percentage of ethylene.

In order for the catalyst system to be useful for the commercial production of an EPDM elastomer, it is desirable for the crystallinity of the polymer to be roughly comparable to that of currently available commercial grades of EPDM for most applications.

Metallocene catalysts typically consist of a transition-metal atom sandwiched between ring structures to form a sterically hindered site. Plastics obtained with metallocene catalysts tend to have increased impact strength and toughness, good melt characteristics, and improved clarity in films.

In actual practice, the extent to which metallocene catalysts can effectively replace traditional catalysts in polymer production depends on the cost and efficiency of the system. Metallocene catalysts cost significantly more than the traditional Ziegler-Natta catalysts but the metallocene systems are considerably more productive. In some cases, the increased productivity of metallocene catalysts relative to the Ziegler-Natta catalysts ranges from one to two orders of magnitude more polymer produced per pound of catalyst.

An example of the use of metallocene catalysts in polymer production is in U.S. Pat. No. 5,304,614 which discloses a process for polymerizing or copolymerizing an olefin in the presence of a catalyst. The catalyst employed is formed from a metallocene procatalyst that has been activated by an aluminoxane and/or compounds of the general formulae $R_xNH_{4-x}$, $BR'_4$, $R_xPH_{4-x}BR'_4$, $R_3CBR'_4$ or $BR'_3$ where x is a number from 1 to 4 and R can be equal or different and is a $C_1$–$C_{10}$ alkyl or $C_6$–$C_{18}$ aryl which can be substituted by an alkyl, haloalkyl or fluorine.

Since the recent introduction of the aluminoxane-activated metallocene catalysts for producing polyethylene, polypropylene, and copolymers of ethylene and α-olefins such as linear low density polyethylene (LLDPE), efforts have been made to apply these catalysts to the production of EPDM elastomers. For this use, it is desired that the catalyst produce high yields of EPDM in a reasonable polymerization time, result in adequate incorporation of the diene monomer(s) and provide a random distribution of monomers while enabling good control of $M_w$ over a wide range while yielding a relatively narrow MWD. However, one of the obstacles to widespread commercial implementation of metallocene catalysts lies in the use of an aluminoxane as cocatalyst. Aluminoxanes are expensive and large amounts are required in order to activate the metallocene catalyst with which they are associated.

SUMMARY OF THE INVENTION

In accordance with the present invention, a process for the polymerization or copolymerization of at least one α-olefin and, optionally, at least one diene monomer to obtain an elastomer is provided, the process comprising polymerizing at least one α-olefin in the presence of a catalytically effective amount of catalyst comprising the product obtained by combining a metallocene procatalyst containing a transition metal with a cocatalyst, the cocatalyst comprising at least one organometallic or organometalloid first component containing at least one compound of the general formula R—Al—O wherein R is a hydrocarbyl group of from 1 to about 30 carbon atoms; and a neutral or ionic metal- and/or metalloid-containing second component having at least one aryl group possessing at least one electron-withdrawing substituent, it being provided that the molar ratio of the first component to the transition metal is from 1 to about 10,000 and the molar ratio of the second component to the transition metal is from 0.01 to about 14.

Further in accordance with the present invention, a catalyst for activating a metallocene procatalyst is provided, which comprises the product obtained by combining the metallocene procatalyst containing a transitional metal with the aforementioned cocatalyst, it being provided that the molar ratio of the first component to the transition metal is from 1 to about 10,000 and the molar ratio of the second component to the transition metal is from 0.01 to about 14.

Still further in accordance with the present invention, a cocatalyst for activating a metallocene procatalyst containing a transition metal is provided which comprises at least one organometallic or organometalloid first component containing at least one compound of the general formula R—Al—O wherein R is a hydrocarbyl group of from 1 to about 30 carbon; and a neutral or ionic metal- and/or metallic-containing second component having at least one aryl group possessing at least one electron-withdrawing substituent.

Yet further in accordance with the present invention a process for the activation of a metallocene procatalyst containing a transition metal with a cocatalyst is provided, the cocatalyst comprising at least one organometallic or organometalloid first component containing at least one compound of the general formula R—Al—O wherein R is a hydrocarbyl group of from 1 to about 30 carbon atoms; and a neutral or ionic metal- and/or metalloid-containing second component having at least one aryl group possessing at least one electron-withdrawing substituent, it being provided that the molar ratio of the first component to the transition metal is from 1 to about 10,000 and the molar ratio of the second component to the transition metal is from 0.01 to about 14, the process comprising combining the metallocene procatalyst with the components of the cocatalyst in any combination or in any order thereof.

DESCRIPTION OF THE PREFERRED EMBODIMENTS

The polymerization process herein employs a catalyst composition obtained by activating a metallocene procatalyst with a suitable cocatalyst.

The metallocene procatalyst can be one or a mixture of metallocene compounds in which the metallocene compound possesses a transition metal. Representatives of the metallocene compounds are known in the art, e.g., in U.S. Pat. Nos. 4,752,597; 4,871,705; 4,892,851; 4,931,417; 4,931,517; 4,933,403; 5,001,205; 5,017,714; 5,026,798; 5,034,549; 5,036,034; 5,055,438; 5,064,802; 5,086,134; 5,087,677; 5,126,301; 5,126,303; 5,132,262; 5,132,380; 5,132,381; 5,145,819; 5,153,157; 5,155,080; 5,225,501; 5,227,440; 5,227,478; 5,229,478; 5,241,025; 5,243,002; 5,278,119; 5,278,265; 5,281,679; 5,296,434; 5,304,614; 5,308,817; 5,324,800; 5,328,969; 5,329,031; 5,330,948; 5,331,057; 5,349,032; 5,369,196; 5,372,980; 5,374,753; 5,384,229; 5,385,877; 5,391,629; 5,391,789; 5,399,636; 5,401,817; 5,406,013; 5,416,177; 5,416,178; 5,416,228; 5,427,991; 5,434,115; 5,436,305; 5,439,994; 5,441,920; 5,442,020; 5,449,651; 5,453,410; 5,455,365; 5,455,366; 5,459,117; 5,466,649; 5,470,811; 5,491,205; 5,491,207; 5,519,100; 5,561,092; and 5,614,457 and in European Patent Nos. 347,129; 575,875; 593,083; 612,769; 632,066; 643,079; and 653,445, the contents of which are incorporated by reference herein. Illustrative of suitable metallocene procatalysts for use herein include zirconocene dichloride, dimethylbis(indenyl)zirconium, racemic-ethylenebis (indenyl) zirconium dichloride, dimethylsilyl bis (cyclopentadienyl) zirconium dichloride, dimethylsilyl (tetramethylcyclo-pentadienyl)(tert-butylamido) titanium dichloride, diphenylmethylene (cyclopentadienyl-9-fluorenyl)zirconium dichloride, diphenylsilyl(cyclopentadienyl-9-fluorenyl) zirconium dichloride and the like. Useful transition metals include titanium, zirconium, hafnium and the like.

Methods for preparing these and other useful metallocene procatalysts are known in the art and do not constitute a part of the present invention.

The cocatalyst, or activator, of the composition described below is used to activate the foregoing metallocene procatalyst. In general, the cocatalyst used herein can be, as a first component, at least one organometallic or organometalloid compound containing at least one compound of the general formula R—Al—O wherein R is a hydrocarbyl group of from 1 to about 30 carbon atoms and preferably from about 1 to about 20; and, as a second component, a neutral or ionic metal- and/or metalloid-containing compound having at least one aryl group possessing at least one electron-withdrawing substituent.

Suitable first components for providing the cocatalyst used herein include alkylaluminum alkoxides such as diisobutylaluminum-tert-butoxide; siloxalanes such as diethylaluminum trimethylsiloxane; dimeric aluminoxanes such as tetraisobutylaluminoxane and oligomeric alminoxanes such as methylaluminoxane. Of the foregoing first components, diisobutylaluminumtert-butoxide and methylaluminoxane are preferred.

Suitable second components for providing the cocatalyst used herein include perfluoroarylboranes such as tris (pentafluorophenyl)borane and salts of perfluoroarylborates such as dimethylanilinium tetrakis (pentafluorophenyl) borate, trityl tetrakis (pentafluorophenyl)borate, lithium tetrakis (pentafluorophenyl)borate and the like. Of the foregoing second components, dimethylanilinium tetrakis (pentafluorophenyl)borate is preferred.

Optionally, at least one trialkylaluminum compound can be employed as a third component when activating the metallocene procatalyst to advantageously remove polar impurities thus preventing deactivation of the catalyst during the polymerization process. Suitable trialkylaluminum compounds include trimethylaluminum, triehtylaluminum, tri(n-propyl)aluminum, triisopropyl-aluminum, tri(n-butyl) aluminum, triisobutylaluminum, tri(n-hexyl)aluminum, tri (n-octyl)aluminum, and the like. Of the foregoing trialkylaluminum compounds, triisobutylaluminum is preferred. In general, the optional trialkylaluminum can be utilized in a molar ratio of trialkylaluminum to metallocene procatalyst, expressed in terms of its transition metal, of from 0 to about 1,000, preferably from about 1 to about 500 and more preferably from about 2 to about 400.

Activation of the metallocene procatalyst can be achieved by combining the metallocene procatalyst with the aforementioned components of the cocatalyst either simultaneously or in any sequence either within, or in the absence of, the olefin monomer and with any interval of time therebetween. Activation of the procatalyst can also be achieved by, for example, reacting the metallocene with the first component of the cocatalyst and thereafter combining the product of this reaction with a solution of the second component in an inert solvent, e.g., toluene, and the optional third component either simultaneously or sequentially either within, or in the absence of, the olefin monomer.

It is particularly advantageous to activate the metallocene procatalyst by reacting the metallocene with at least a portion of the first component of the cocatalyst and thereafter combining the product of this reaction with the product obtained from the reaction of the second component of the cocatalyst with the remaining portion of the first component either simultaneously or sequentially and in the absence of the olefin monomer.

For reasons discussed below, activation of the procatalyst outside the polymerization reactor in the absence of monomer is preferred. The reaction of the metallocene procatalyst with a portion of the first component and the reaction of the second component with the remaining portion of the first component are both performed separately prior to combining the products obtained thereof and are advantageously conducted at ambient temperature for a period ranging from about 1 minute to about 60 minutes. In general, the molar ratio of the first component of the cocatalyst to metallocene procatalyst, expressed in terms of its transition metal, can vary from 1 to about 10,000, preferably from about 5 to about 2,000 and more preferably from about 10 to about 1,000 and the molar ratio of the second component of the cocatalyst to metallocene procatalyst, expressed in terms of its transition metal, can vary from 0.01 to about 14, preferably from about 0.1 to about 12 and more preferably from about 0.2 to about 10.

As one skilled in the art will readily appreciate, the catalyst composition of this invention can be a supported catalyst composition. Suitable support material for preparing the supported catalyst used herein can be any finely divided inorganic solid porous support, such as, for example, talc, silica, alumina, silica-alumina or mixtures thereof. Other suitable inorganic oxides that can be employed either alone or in combination with silica or silica-alumina include magnesia, titania, zirconia, and the like. The inorganic oxides can be dehydrated, as is well known in the art, to remove water. If desired, the residual surface hydroxyl groups in the inorganic solid porous support can be removed by additional heating or by reaction with dehydroxylating agents such as lithium alkyls, silyl chlorides, aluminum alkyls, or preferably with aluminoxane. A preferred support material is a dehydrated inorganic oxide treated with an aluminoxane such as methylalumoxane and more preferred is a dehydrated silica gel treated with methylalumoxane.

The α-olefins suitable for use in the preparation of the elastomers herein contain from 2 to about 20 carbon atoms and include ethylene, propylene, 1-butene, 3-methylbutene, 1-pentene, 4-methyl-1-pentene, 1-hexene, 1-octene, 1-decene, 1-dodecene, and vinyl aromatic monomers such as styrene, α-methyl styrene and the like. Of the foregoing α-olefins, ethylene and propylene are preferred.

The optional diene monomer(s) can be conjugated or nonconjugated. Conjugated monomers include butadiene, isoprene, 2,3-dimethylbutadiene and cyclopentadiene.

Examples of suitable nonconjugated dienes include straight chain acyclic dienes such as 1,4-hexadiene, 1,5-hexadiene, 1,6-heptadiene, and, 1,7-octadiene; branched chain acyclic dienes such as 4-methyl-1,5-hexadiene, 5-methyl-1,4-hexadiene, 3,7-dimethyl-1,6-octadiene, 3-7-dimethyl-1,7-octadiene and mixed isomers of dihydromyrcene and dihydroocinene; unsubstituted and substituted cyclic dienes such as 1,4-cyclohexadiene, 1,5-cyclooctadiene and 1,5-cyclododecadiene; and, multicyclic dienes such as tetrahydroindene, methyltetrahydroindene, dicyclopentadiene; bicyclo-(2,2,1)-hepta-2,6-diene; alkenyl, alkylidene, cycloalkenyl and cycloalkylidene norbonenes such as 5-methylene-2-norbornene, 5-ethylidene-2-norbornene, 5-propenyl-2-norbornene, 5-isopropylidene-2-norbornene, 5-butenyl-2-norbornene, 5-(4-cyclopentenyl)-2-norbornene, 5-cyclohexylidene-2-norbornene, 5-vinyl-2-norbornene and norbornadiene. Of the foregoing dienes used to prepare, for example, EODEs, the preferred ones are 1,4-hexadiene, 5-ethylidene-2-norbornene, 5-vinylidene-2-norbornene, 5-methylene-2-norbornene and dicyclopentadiene and of these, 5-ethylidene-2-norbornene and dicyclopentadiene are more preferred.

The elastomeric α-olefin copolymers and EODEs can contain, e.g., in the case of an ethylene-propylene copolymer, up to about 90, preferably from about 30 to about 85, and more preferably from about 35 to about 80, weight percent ethylene, and from about 10 to about 70, preferably from about 11 to about 65, and more preferably from about 15 to about 60, weight percent propylene, the balance being the optional diene monomer(s). The diene monomer(s), when utilized, can be incorporated into the α-olefin copolymer at a level of from about 0.1 to about 30, preferably from about 1 to about 25 and more preferably from about 1 to about 20, weight percent.

Polymerization or copolymerization of the aforementioned monomers using the catalyst of the present invention can be carried out in any known manner, e.g., in a solution, suspension or slurry process, either continuously or in batch. These processes are generally carried out at temperatures in the range of from about 0° C. to about 200° C. and preferably from about 30° C. to about 80° C., and pressures from about 10 to about 3000 psig. Dilution solvents that can be employed include straight and branched chain hydrocarbons such as the butanes, the pentanes, the hexanes, the heptanes, the octanes, and the like, cyclic and alicyclic hydrocarbons such as cyclopentane, cyclohexane, cycloheptane, methyl-cyclopentane, methylcyclohexane, methylcycloheptane and the like, and alkyl-substituted aromatic compounds such as toluene, xylene, and the like.

A typical batch solution polymerization process can be carried out by first introducing the hydrocarbon solvent, e.g., cyclohexane, into a stirred tank reactor. The monomer feed comprising, e.g., ethylene, propylene, and diene(s) (if utilized) is then sparged into the liquid phase. A hydrocarbon solution of the catalyst in the required amount is then added to the liquid phase in the reactor. The rate of polymerization is controlled by the concentration of the catalyst. The reactor temperature is controlled by means of cooling coils, etc., and the initial total pressure in the reactor is maintained by a constant flow of gaseous monomer(s). By maintaining a faster rate of flow of gas(es) through the reactor than the rate of polymerization, the conditions in the reactor will approximate steady state conditions. The ethylene content of the elastomer product is determined by the metallocene catalyst used and by the ratio of ethylene to propylene in the reactor which is controlled by manipulating the relative feed rates of these monomers to the reactor. After polymerization and deactivation of the catalyst followed by coagulation of the elastomer, the latter can be recovered by any suitable means and further processed as desired.

In a slurry polymerization process, a suspension of the solid, particulate polymer is formed in the hydrocarbon diluent to which the α-olefin(s), any optional diene(s) and the catalyst composition have been added. Slurry polymerization proceeds much like solution polymerization.

Preferred polyolefin elastomers that can be obtained by the polymerization process herein possess a unique combination of high molecular weight ($M_w$), high Mooney viscosity ($ML_{1+4}$) low polydispersity index ($M_w/M_n$) and low glass transition temperature ($T_g$) properties that distinguish them from known polyolefin elastomers. The novel polyolefin elastomers of this invention prior to curing possess a $M_w$ of from about 70,000 to about 2,000,000, preferably from about 250,000 to about 1,750,000 and more preferably from about 300,000 to about 1,500,000, a $ML_{1+4}$ at 125° C. of from about 10 to about 200, preferably from about 15 to about 160 and more preferably from about 20 to about 150, a $M_w/M_n$ of from about 1.5 to about 10, preferably from about 1.75 to about 8.5 and more preferably from about 2.0 to about 7.5, and a $T_g$ (°C.) of below about −25, preferably below about −30 and more preferably below about −40.

These advantageous properties can be exploited in a variety of products. Thus, polymer blends can be prepared which contain an elastomer in accordance with this invention and one or more other hydrocarbon polymers with which elastomers such as the EPDMs are known to be compatible, e.g., poly(α-olefin) homopolymers and copolymers, polystyrene, ethylene/cycloolefin copolymer, butyl rubber, polyisoprene, polybutadiene, and the like. The elastomer herein can be incorporated into any of a wide assortment of rubber articles such as hoses, tubing, power transmission belts including V-belts, conveyor belts, timing belts and industrial flat belts, air springs, roofing membranes, weather stripping, bushings, vibration mounts, bridge bearing pads, shoe soles and heels, jacketing for wire or cable, and the like. The elastomer of this invention is also useful as a viscosity modifier for lubricating oils.

To facilitate the manufacture of a polymer blend, the elastomer herein can be provided as an oil-extended polymer prior to mixing with the other hydrocarbon polymer. The elastomer can be oil-extended by the well known procedure of adding oil to the polymer after it is recovered from the polymerization reactor. The oil can be selected from the naphthenic or paraffinic oils, typically in amounts of from about 5 to about 150 parts by weight of oil per 100 parts by weight of elastomer. Alternatively, part or all of the oil can be added to the elastomer and other hydrocarbon polymer during the blending operation.

The elastomer of this invention can be formulated in a known manner with any of the many usual compounding ingredients, for example, a vulcanizing or curative package containing one or more vulcanizing agents, accelerators, activators, retarders, and the like. Other common formulation ingredients include antiozonants, antioxidants, plasticizing oils and softeners, fillers, reinforcing pigments and carbon blacks.

EXAMPLES

The examples that follow include those that are illustrative of the invention (Examples 1–27) and those that are illustrative of known polymerization processes, catalysts and elastomers (Comparative Examples 1–25). The procatalysts, cocatalyst components, solvents and monomers employed in these examples are as follows:

1. zirconium dichloride[$Cp_2ZrCl_2$]
2. dimethylbis(indenyl)zirconium[$Ind_2ZrMe_2$]
3. racemic-ethylenebis(indenyl)zirconium dichloride[rac-Et $(Ind)_2ZrCl_2$]
4. dimethylsilylbis(cyclopentadienyl)zirconium dichloride [$Me_2Si(Cp)_2ZrCl_2$]
5. dimethylsilyl(tetramethylcyclopentadienyl)(tert-butylamido) titanium dichloride [$Me_2Si(C_5Me_4)(ButN)TiCl_2$]
6. diphenylmethylene(cyclopentadienyl-9-fluorenyl) zirconium dichloride [$Ph_2C(Cp-9-Flu)ZrCl_2$]
7. diphenylsilyl(cyclopentadienyl-9-fluorenyl)zirconium dichloride[$Ph_2Si(Cp-9-Flu)ZrCl_2$]
8. triisobutylaluminum[$Al(Bu^i)_3$]
9. 5-ethylidene-2-norbornene[ENB]
10. dicyclopentadiene[DCPD]
11. trityl tetrakis(pentafluorophenyl)borate [$Ph_3CB(C_6F_5)_4$] ("TriB")
12. dimethylanilinium tetrakis(pentafluorophenyl)borate [$HNMe_2PhB$ $(C6F_5)_4$] ("AnB")
13. lithium tetrakis(pentafluorophenyl)borate[$LiB(C_6F_5)_4$] ("LiB")
14. methyl aluminoxane [MAO]

Hexane solvent was purified over 3 Å molecular sieves. Toluene solvent was distilled from molten sodium and degassed with dry, deoxygenated argon. Ethylene and propylene, both high purity grade monomers, were purified by passage over molecular, sieves and a deoxygenation catalyst. The diene monomers 5-ethylidene-2-norbornene [ENB] and dicyclopentadiene [DCPD] were deinhibited over activated alumina and stored over 4 Å molecular sieves.

The following procedures were used to determine the properties of the elastomers.

Weight Average Molecular Weight ($M_w$), Number Average Molecular Weight ($M_n$) and ($M_w/M_n$)

The molecular weights of the elastomers, $M_w$ and Mn, were measured in orthodichlorobenzene at 130° C. on a Waters GPC 150C gel permeation chromatograph equipped with a Waters RA401 refractive index detector and Waters Styragel HT columns (10E5 Å, 10E4 Å, 10E3 Å, and 10E6 Å). Molecular weights were calculated from elution times calibrated against polystyrene standards from American Polymer Standards Corp. (narrow molecular weight distribution, $M_n$ from 9300 to $2.1 \times 10^6$)

Mooney Viscosity ($ML_{1+4}$ at 125° C.)

The Mooney viscosity of the elastomers, $ML_{1+4}$ at 125° C., was measured on a Monsanto Mooney Viscometer model MV 2000 according to ASTM standard D1646.

Glass Transition Temperature ($T_g$)

The glass transition temperatures of the elastomers ($T_g$) were measured by differential scanning calorimetry upon 20–25 mg of polymer molded at 150° C. for 15 minutes followed by annealing at room temperature for 24 h. $T_g$ is reported as the midpoint of the glass transition on the heating curve of the sample, recorded on a Perkin Elmer DSC 7 differential scanning calorimeter (from −100° C. to 180° C. at a heating rate of 20° C./minute).

Ethylene:Propylene Ratio and Diene Content

The ethylene:propylene ratio and the diene content of the elastomers were determined by infrared spectroscopy of thin polymer films on a Perkin-Elmer infrared spectrophotometer model Paragon 1000 PC, according to ASTM standard D3900.

Comparative Examples 1–25

Several activated metallocene catalysts were utilized for the attempted preparation of EP and EPDM-type elastomers. The EP and EPDM-type elastomers were prepared by the following general solution polymerization procedure.

A 2.5-liter glass reactor was charged with 1,500 mL of hexane, the specific amount of $Al(Bu^i)_3$, and the appropriate aliquot of diene, if desired. This was followed by charging with 50 psig each of ethylene and propylene with the mass flow ration determined on rotometers. The charged reactor was allowed to equilibrate at the selected reaction temperature. The premixed catalyst/cocatalyst solution or alternatively the catalyst solution followed by the remaining components of cocatalyst was injected into the reactor. Ethylene and propylene were supplied on demand to maintain the reactor pressure at 50 psig. The polymerization was terminated with 100 mL of acidified methanol (1 volume percent concentrated HCL) and the resulting polymer was coagulated and thereafter mill-dried.

The polymer products were analyzed by IR spectroscopy to determine ethylene/propylene ratio and diene content. In addition, for most samples, molecular weight (Mw), thermal transitions (DSC), tangent δ and Mooney viscosity at 125° C. were determined. The specific conditions of each polymerization and the physical properties of the resulting polymers are summarized below in Table 1.

TABLE 1

COMPARATIVE EXAMPLES 1–25

A. POLYMERIZATION CONDITIONS AND RESULTS

| COMP. EX.* | PROCATALYST M | μmol M | T (° C.) | FEED E:P | DIENE TYPE | DIENE mL | mmol Al ($Bu^i$) | μmol Al (MAO) | BORATE TYPE | BORATE μmol | YIELD (g) | ACTIVITY kg/gZr/h |
|---|---|---|---|---|---|---|---|---|---|---|---|---|
| 1 | $Cp_2ZrCl_2$ | 10.0 | 40 | 1:2 | — | — | 1.0 | 10000 | — | — | 27 | 178 |
| 2 | $Cp_2ZrCl_2$ | 10.0 | 40 | 1:2 | — | — | 1.0 | — | AnB | 10.0 | 33 | 219 |
| 3 | $Ind_2ZrMe_2$ | 5.0 | 40 | 1:1 | — | — | 1.0 | 5000 | — | — | 26 | 338 |
| 4 | $Ind_2ZrMe_2$ | 5.0 | 40 | 1:1 | — | — | — | 5000 | — | — | 2 | 26 |
| 5 | $Ind_2ZrMe_2$ | 5.0 | 40 | 1:1 | — | — | 1.0 | — | AnB | 5.0 | 46 | 603 |
| 6 | $Ind_2ZrMe_2$ | 10.0 | 40 | 1:1 | — | — | — | — | AnB | 10.0 | — | — |
| 7 | $Ind_2ZrMe_2$ | 5.0 | 40 | 1:1 | ENB | 10.0 | 1.0 | — | AnB | 5.0 | 32 | 423 |
| 8 | rac-$Et(Ind)_2ZrCl_2$ | 2.5 | 40 | 1:1 | ENB | 10.0 | 1.0 | — | AnB | 2.5 | 95 | 2512 |
| 9 | $Me_2Si(Cp)_2ZrCl_2$ | 5.0 | 40 | 1:2 | — | — | 1.0 | — | AnB | 5.0 | 13 | 167 |
| 10 | $Me_2Si(Cp)_2ZrCl_2$ | 10.0 | 40 | 1:2 | ENB | 10.0 | 1.0 | — | AnB | 10.0 | — | — |
| 11 | $Me_2Si(C_5Me_4)(Bu^tN)TiCl_2$ | 5.0 | 40 | 1:1 | — | — | 1.0 | 5000 | — | — | 12 | 289 |
| 12 | $Me_2Si(C_5Me_4)(Bu^tN)TiCl_2$ | 5.0 | 40 | 1:1 | — | — | 1.0 | — | AnB | 5.0 | 36 | 911 |
| 13 | $Me_2Si(C_5Me_4)(Bu^tN)TiCl_2$ | 5.0 | 40 | 1:1 | ENB | 10.0 | 1.0 | — | AnB | 5.0 | 21 | 526 |
| 14 | $Ph_2C(Cp-9-Flu)ZrCl_2$ | 5.0 | 40 | 1:1 | ENB | 10.0 | 1.0 | 5000 | — | — | 43 | 572 |
| 15 | $Ph_2C(Cp-9-Flu)ZrCl_2$ | 5.0 | 40 | 1:1 | — | — | 1.0 | — | AnB | 5.0 | 74 | 980 |
| 16 | $Ph_2C(Cp-9-Flu)ZrCl_2$ | 5.0 | 40 | 1:1 | ENB | 10.0 | 1.0 | — | AnB | 5.0 | 46 | 606 |
| 17 | $Ph_2Si(Cp-9-Flu)ZrCl_2$ | 5.0 | 40 | 1:1 | — | — | 1.0 | 5000 | — | — | 49 | 649 |
| 18 | $Ph_2Si(Cp-9-Flu)ZrCl_2$ | 5.0 | 40 | 1:1 | ENB | 10.0 | 1.0 | 5000 | — | — | 37 | 487 |
| 19 | $Ph_2Si(Cp-9-Flu)ZrCl_2$ | 5.0 | 40 | 1:1 | ENB | 10.0 | 1.0 | 2500 | — | — | 8 | 105 |
| 20 | $Ph_2Si(Cp-9-Flu)ZrCl_2$ | 5.0 | 40 | 1:1 | ENB | 10.0 | 1.0 | — | AnB | 5.0 | 79 | 1037 |
| 21 | $Ph_2Si(Cp-9-Flu)ZrCl_2$ | 5.0 | 40 | 1:1 | ENB | 10.0 | 1.0 | — | AnB | 10.0 | 97 | 1271 |
| 22 | $Ph_2Si(Cp-9-Flu)ZrCl_2$ | 5.0 | 40 | 1:1 | ENB | 10.0 | 1.0 | — | AnB | 15.0 | 112 | 1476 |
| 23 | $Ph_2Si(Cp-9-Flu)ZrCl_2$ | 5.0 | 40 | 1:1 | DCPD | 10.0 | 1.0 | — | AnB | 5.0 | 41 | 536 |
| 24 | $Ph_2Si(Cp-9-Flu)ZrCl_2$ | 5.0 | 40 | 1:1 | DCPD | 10.0 | 1.0 | — | TriB | 5.0 | 38 | 501 |
| 25 | $Ph_2Si(Cp-9-Flu)ZrCl_2$ | 5.0 | 40 | 1:1 | DCPD | 10.0 | 1.0 | — | AnB | 10.0 | — | — |

TABLE 1-continued

COMPARATIVE EXAMPLES 1–25

B. POLYMER PROPERTIES

| COMP. EX. | $M_w \times 10^{-3}$ | $M_w/M_n$ | $ML_{1+4}$ (125° C.) | POLYMER E:P | DIENE (wt %) | Tg (° C.) | COMMENT |
|---|---|---|---|---|---|---|---|
| 1 | 78 | 2.28 | n.d. | 87:13 | — | n.d. | Low activity |
| 2 | 310 | 2.11 | n.d. | 91:09 | — | n.d. | High initial activity, rapid decay |
| 3 | 222 | 1.85 | n.d. | 61:39 | — | −47 | Low activity |
| 4 | 193 | 1.96 | n.d. | 65:35 | — | −45 | Very low activity |
| 5 | 196 | 1.96 | n.d. | 57:43 | — | −55 | High initial activity, rapid decay |
| 6 | — | — | — | — | — | — | No activity |
| 7 | 214 | 1.90 | 12 | 63:37 | 8.8 | −47 | High initial activity, rapid decay, gel |
| 8 | 87 | 1.99 | n.d. | 60:40 | 5.7 | −56 | High initial activity, rapid decay, gel |
| 9 | 17 | 1.94 | n.d. | 78:22 | — | n.d. | Initial activity, rapid decay |
| 10 | — | — | — | — | — | — | No activity |
| 11 | 323 | 1.85 | 23 | 57:43 | — | −44 | Sustained, low activity |
| 12 | 590 | 1.83 | 78 | 58:42 | — | −51 | High initial activity, rapid decay |
| 13 | 792 | 1.84 | 110 | 57:43 | 2.2 | −50 | High initial activity, rapid decay, gel |
| 14 | 185 | 1.82 | 17 | 63:37 | 6.4 | −44 | Sustained activity |
| 15 | 202 | 1.72 | 13 | 55:45 | — | −53 | High initial activity, rapid decay |
| 16 | 191 | 1.75 | 21 | 62:38 | 7.8 | −43 | High initial activity, rapid decay, gel |
| 17 | 496 | 2.22 | 77 | 63:37 | — | −47 | Sustained activity |
| 18 | 531 | 2.41 | n.d. | 69:31 | 6.4 | n.d. | Sustained activity |
| 19 | 526 | 2.28 | 84 | 68:32 | 7.0 | −45 | Very low activity |
| 20 | 553 | 2.41 | 93 | 63:37 | 7.2 | −53 | High initial activity, rapid decay, gel |
| 21 | 558 | 2.39 | 94 | 64:36 | 7.3 | −53 | High initial activity, rapid decay, gel |
| 22 | 561 | 2.37 | 94 | 65:35 | 7.1 | −53 | High initial activity, rapid decay, gel |
| 23 | 525 | 2.12 | 89 | 69:31 | 6.6 | −53 | High initial activity, rapid decay, gel |
| 24 | 535 | 2.08 | 91 | 68:32 | 6.7 | −54 | High initial activity, rapid decay |
| 25 | — | — | — | — | — | — | No activity |

*All examples were carried out at 50 psi for 10 minutes.

Examples 1–27

A cocatalyst in accordance with this invention was used to activate several metallocene procatalysts which, upon activation, the catalysts were utilized for the production of elastomers. The elastomers were prepared by the following general solution polymerization procedure.

A 2.5-liter glass reactor was charged with 1,500 mL of hexane, the specific amount of $Al(Bu^i)_3$, and the appropriate aliquot of diene, if desired. This was followed by charging with 50 psig each of ethylene and propylene with the mass flow ration determined on rotometers. The charged reactor was allowed to equilibriate at the selected reaction temperature. The premixed catalyst/cocatalyst solution or alternatively the catalyst solution followed by the remaining components of cocatalyst was injected into the reactor. Ethylene and propylene were supplied on demand to maintain the reactor pressure at 50 psig. The polymerization was terminated with 100 mL of acidified methanol (1 volume percent concentrated HCL) and the resulting polymer was coagulated and thereafter mill-dried.

The polymer products were analyzed by IR spectroscopy to determine ethylene/propylene ratio and diene content. In addition, for most samples, molecular weight (Mw), thermal transitions (DSC), tangent δ and Mooney viscosity at 125° C. were determined. The specific conditions of each polymerization and the physical properties of the resulting polymers are summarized in Table 2.

TABLE 2

EXAMPLES 1–27

A. POLYMERIZATION CONDITIONS

| EX.* | PROCATALYST M | µmol M | T (° C.) | FEED E:P | DIENE TYPE | DIENE mL | mmol Al ($Bu^i$) | µmol Al (MAO) | BORATE TYPE | BORATE µmol |
|---|---|---|---|---|---|---|---|---|---|---|
| 1 | $Cp_2ZrCl_2$ | 10.0 | 40 | 1:2 | — | — | 1.0 | 1000 | AnB | 10.0 |
| 2 | $Cp_2ZrCl_2$ | 5.0 | 40 | 1:1 | — | — | 1.0 | 1000 | AnB | 5.0 |
| 3 | $Ind_2ZrMe_2$ | 5.0 | 40 | 1:1 | — | — | 1.0 | 500 | AnB | 5.0 |
| 4 | $Ind_2ZrMe_2$ | 5.0 | 40 | 1:1 | — | — | — | 500 | AnB | 5.0 |
| 5 | $Ind_2ZrMe_2$ | 5.0 | 40 | 1:1 | ENB | 10.0 | — | 1000 | AnB | 5.0 |
| 6 | $Ind_2ZrMe_2$ | 5.0 | 40 | 1:1 | ENB | 10.0 | — | 500 | AnB | 5.0 |
| 7 | rac-Et$(Ind)_2ZrCl_2$ | 2.5 | 40 | 1:1 | — | — | 1.0 | 500 | AnB | 2.5 |
| 8 | rac-Et$(Ind)_2ZrCl_2$ | 2.5 | 40 | 1:1 | ENB | 10.0 | 1.0 | 250 | AnB | 2.5 |

TABLE 2-continued

EXAMPLES 1–27

| | | | | | | | | | | |
|---|---|---|---|---|---|---|---|---|---|---|
| 9 | rac-Et(Ind)$_2$ZrCl$_2$ | 2.5 | 40 | 1:1 | ENB | 10.0 | 1.0 | 250 | AnB | 1.25 |
| 10 | rac-Et(Ind)$_2$ZrCl$_2$ | 2.5 | 40 | 1:1 | ENB | 10.0 | 1.0 | 62.5 | AnB | 2.5 |
| 11 | Me$_2$Si(Cp)$_2$ZrCl$_2$ | 5.0 | 40 | 1:2 | — | — | 1.0 | 125 | AnB | 5.0 |
| 12 | Me$_2$Si(Cp)$_2$ZrCl$_2$ | 5.0 | 40 | 1:2 | ENB | 10.0 | 1.0 | 125 | AnB | 5.0 |
| 13 | Me$_2$Si(C$_5$Me$_4$)(Bu$^t$N)TiCl$_2$ | 5.0 | 40 | 1:1 | — | — | 1.0 | 125 | AnB | 5.0 |
| 14 | Me$_2$Si(C$_5$Me$_4$)(Bu$^t$N)TiCl$_2$ | 5.0 | 40 | 1:1 | ENB | 10.0 | 1.0 | 125 | AnB | 5.0 |
| 15 | Ph$_2$C(Cp-9-Flu)ZrCl$_2$ | 5.0 | 40 | 1:1 | ENB | 10.0 | — | 500 | AnB | 5.0 |
| 16 | Ph$_2$C(Cp-9-Flu)ZrCl$_2$ | 5.0 | 40 | 1:1 | ENB | 10.0 | — | 125 | AnB | 5.0 |
| 17 | Ph$_2$C(Cp-9-Flu)ZrCl$_2$ | 5.0 | 40 | 1:1 | — | — | — | 50 | AnB | 5.0 |
| 18 | Ph$_2$C(Cp-9-Flu)ZrCl$_2$ | 5.0 | 40 | 1:1 | ENB | 10.0 | — | 50 | AnB | 5.0 |
| 19 | Ph$_2$Si(Cp-9-Flu)ZrCl$_2$ | 5.0 | 40 | 1:1 | — | 10.0 | — | 500 | AnB | 5.0 |
| 20 | Ph$_2$Si(Cp-9-Flu)ZrCl$_2$ | 5.0 | 40 | 1:1 | ENB | 10.0 | — | 500 | AnB | 5.0 |
| 21 | Ph$_2$Si(Cp-9-Flu)ZrCl$_2$ | 5.0 | 40 | 1:1 | ENB | 10.0 | — | 125 | AnB | 5.0 |
| 22 | Ph$_2$Si(Cp-9-Flu)ZrCl$_2$ | 5.0 | 40 | 1:1 | DCPD | 10.0 | 1.0 | 125 | AnB | 15.0 |
| 23 | Ph$_2$Si(Cp-9-Flu)ZrCl$_2$ | 5.0 | 40 | 1:1 | DCPD | 10.0 | 1.0 | 125 | AnB | 10.0 |
| 24 | Ph$_2$Si(Cp-9-Flu)ZrCl$_2$ | 5.0 | 40 | 1:1 | DCPD | 10.0 | 1.0 | 125 | AnB | 5.0 |
| 25 | Ph$_2$Si(Cp-9-Flu)ZrCl$_2$ | 5.0 | 40 | 1:1 | DCPD | 10.0 | 1.0 | 125 | AnB | 2.5 |
| 26 | Ph$_2$Si(Cp-9-Flu)ZrCl$_2$ | 5.0 | 40 | 1:1 | DCPD | 10.0 | 1.0 | 125 | TriB | 5.0 |
| 27 | Ph$_2$Si(Cp-9-Flu)ZrCl$_2$ | 5.0 | 40 | 1:1 | DCPD | 10.0 | 1.0 | 125 | LiB | 5.0 |

B. POLYMERIZATION RESULTS AND POLYMER PROPERTIES

| EX. | YIELD (g) | ACTIVITY kg/gZr/h | $M_w \times 10^{-3}$ | $M_w/M_n$ | $ML_{1+4}$ (125° C.) | POLYMER E:P | DIENE (wt %) | $T_g$ (° C.) | COMMENT |
|---|---|---|---|---|---|---|---|---|---|
| 1 | 45 | 294 | 253 | 1.89 | 18 | 75:25 | — | n.d. | Sustained activity |
| 2 | 177 | 2329 | 211 | 1.83 | 10 | 47:53 | — | −56 | Sustained activity |
| 3 | 214 | 2811 | 234 | 1.81 | 13 | 44:56 | — | −55 | Sustained activity |
| 4 | 208 | 2733 | 253 | 1.90 | 14 | 44:56 | — | −56 | Sustained activity |
| 5 | 90 | 1178 | 232 | 1.83 | 12 | 65:35 | 10.7 | −52 | Sustained activity, no gel |
| 6 | 168 | 2214 | 222 | 1.78 | 12 | 60:40 | 5.1 | −53 | Sustained activity, no gel |
| 7 | 91 | 2387 | 90 | 1.87 | n.d. | 68:32 | — | −55 | Sustained activity |
| 8 | 159 | 4191 | 85 | 1.97 | n.d. | 56:44 | 5.3 | −54 | Sustained activity, no gel |
| 9 | 73 | 1928 | 104 | 1.97 | n.d. | 73:27 | 5.7 | −38 | Sustained activity, no gel |
| 10 | 222 | 5839 | 79 | 1.91 | n.d. | 39:61 | 3.6 | −57 | Sustained activity, no gel |
| 11 | 20 | 261 | 17 | 1.92 | n.d. | 69:31 | — | n.d. | Sustained activity |
| 12 | 26 | 338 | 17 | 1.94 | n.d. | 66:34 | 8.4 | n.d. | Sustained activity |
| 13 | 43 | 1089 | 827 | 1.82 | 129 | 42:58 | — | −56 | Sustained activity |
| 14 | 54 | 1355 | 874 | 1.88 | 145 | 43:57 | 5.8 | −53 | Sustained activity, no gel |
| 15 | 69 | 914 | 207 | 1.79 | 24 | 59:41 | 8.0 | −49 | Sustained activity, no gel |
| 16 | 68 | 898 | 209 | 1.75 | 25 | 58:42 | 8.2 | −48 | Sustained activity, no gel |
| 17 | 94 | 1240 | 208 | 1.72 | 14 | 51:49 | — | −56 | Sustained activity |
| 18 | 103 | 1349 | 207 | 1.70 | 24 | 56:44 | 6.6 | −51 | Sustained activity, no gel |
| 19 | 140 | 1846 | 511 | 2.03 | 83 | 49:51 | — | −57 | Sustained activity |
| 20 | 194 | 2546 | 566 | 2.01 | 97 | 58:42 | 4.6 | −54 | Sustained activity, no gel |
| 21 | 208 | 2733 | 559 | 2.08 | 96 | 59:41 | 4.3 | −53 | Sustained activity, no gel |
| 22 | 108 | 1418 | 577 | 2.15 | 99 | 60:40 | 7.3 | −52 | Sustained activity, no gel |
| 23 | 163 | 2142 | 565 | 2.13 | 98 | 60:40 | 5.9 | −52 | Sustained activity, no gel |
| 24 | 191 | 2515 | 571 | 2.09 | 97 | 61:39 | 5.0 | −53 | Sustained activity, no gel |
| 25 | 92 | 1209 | 523 | 2.35 | 86 | 70:30 | 4.4 | −47 | Sustained activity, no gel |
| 26 | 134 | 1769 | 577 | 2.14 | 116 | 57:43 | 7.2 | −54 | Sustained activity |
| 27 | 67 | 884 | 586 | 2.14 | 131 | 55:45 | 7.1 | −53 | Sustained activity |

*All examples were carried out at 50 psi for 10 minutes.

DISCUSSION OF COMPARATIVE EXAMPLES AND EXAMPLES

By way of demonstrating that the cocatalyst in accordance with this invention is advantageous to the activation of metallocene procatalysts, the following procatalysts were employed, exemplifying a range of ligand structures and metal centres:

LIGAND ATTRIBUTES

| Procatalyst | Substituted Cp | Bridged | Symmetric | Heteroatom |
|---|---|---|---|---|
| Cp$_2$ZrCl$_2$ | no | no | yes | no |
| Ind$_2$ZrMe$_2$ | yes | no | yes | no |
| Me$_2$Si (Cp)$_2$ZrCl$_2$ | no | yes | yes | no |
| rac-Et (Ind)$_2$ZrCl$_2$ | yes | yes | yes | no |
| Ph$_2$C (Cp-9-Flu) ZrCl$_2$ | yes | yes | no | no |
| Ph$_2$Si (Cp-9-Flu) ZrCl$_2$ | yes | yes | no | no |
| Me$_2$Si (C$_5$Me$_4$) (Bu$^t$N) TiCl$_2$ | yes | yes | no | yes |

As is well known to those skilled in the art, it is often advantageous to gauge the performance of a polymerization catalyst not only by its activity and longevity, but also by the properties of the resultant polymers. Therefore, as discussed below, in explicating the efficacy of the present invention, careful consideration was given to the subtle influence of catalyst behavior on a variety of polymer properties of particular interest to polyolefin elastomers.

1. Improved Catalyst Activity

Comparison of Tables 1 and 2 illustrates that in the case of similar monomer feed compositions, the use of a cocatalyst in accordance with this invention (Examples 1–27 of Table 2) resulted in a markedly higher catalyst activity for every metallocene procatalyst tested than the cocatalyst outside (Comparative Examples 1–25 of Table 1) the scope of the invention. Additionally, as shown in the Comparative Examples of Table 1, the catalysts activated by a cocatalyst not containing the first component, MAO, uniformly displayed extremely high initial activity followed by rapid decay. In contrast to these results, the Examples of Table 2 illustrating the use of a cocatalyst in accordance with this invention, specifically with MAO as the first component thereof, generated catalysts that were both highly active and long-lived with little or no loss in activity over the course of the polymerization reaction.

2. Use of Trialkylaluminum Compounds

The addition of a trialkylaluminum compound to a metallocene procatalyst serves two functions. First, the trialkylaluminum compound reacts with polar impurities in the polymerization reaction mixture to prevent deactivation of the catalyst. Second, when the metallocene procatalyst is coordinated by exchangeable anionic ligands such as halide ions, the trialkylaluminum compound participates in a ligand metathesis reaction as illustrated in the following equation:

$$Cp_2MX_2 + 2AlR_3 \rightarrow Cp_2MR_2 + 2AlR_2X$$

where M is a transition metal, X is a halide, and R is hydrocarbyl. This is also one of the functions of the MAO catalyst, and consequently, the addition of a trialkylaluminum compound will allow for the reduction in the amount of the MAO cocatalyst required to yield an active catalyst. In a catalyst system that does not employ a MAO cocatalyst, the trialkylaluminum compound is essential to effect transition metal alkylation when the metallocene procatalyst is coordinated by halide ligands.

For these reasons, Comparative Examples 3–6 and Examples 3 and 4 were carried out with a transition metal-alkylated metallocene procatalyst, $Ind_2ZrMe_2$, that does not require the alkylating function of the trialkylaluminum compound. Effort was also made to minimize the presence of trade impurities by using auxiliary purifiers on the solvent and monomer feeds. Cogent results of these examples are summarized below in Table 3.

TABLE 3

COMPARATIVE EXAMPLES 3–6
EXAMPLES 3–4
A. POLYMERIZATION CONDITIONS AND RESULTS

| COMP. EX./ EX. | PROCATALYST M | μmol M | mmol Al (Bu$^i$) | Al (Bu$^i$)/M | μmol Al (MAO) | Al (MAO)/M | BORATE TYPE | μmol | B/M | ACTIVITY kg/gZr/h |
|---|---|---|---|---|---|---|---|---|---|---|
| 3 | $Ind_2ZrMe_2$ | 5.0 | 1.0 | 200 | 5000 | 1000 | — | — | — | 338 |
| 4 | $Ind_2ZrMe_2$ | 5.0 | — | — | 5000 | 1000 | — | — | — | 26 |
| 5 | $Ind_2ZrMe_2$ | 5.0 | 1.0 | 200 | — | — | AnB | 5.0 | 1 | 603 |
| 6 | $Ind_2ZrMe_2$ | 10.0 | — | — | — | — | AnB | 10.0 | 1 | — |
| 3 | $Ind_2ZrMe_2$ | 5.0 | 1.0 | 200 | 500 | 100 | AnB | 5.0 | 1 | 2811 |
| 4 | $Ind_2ZrMe_2$ | 5.0 | — | — | 500 | 100 | AnB | 5.0 | 1 | 2733 |

As these data show, comparison of Example 3 with 4 illustrates that the presence of triisobutylaluminum has virtually no influence on polymer yields, catalyst activities or on any measurable polymer properties (See Table 2). By contrast, Comparative Examples 3 and 4, both of which used a MAO catalyst, and Comparative Examples 5 and 6, both of which did not use a MAO catalyst, illustrate that the presence of triisobutylaluminum does have a dramatic influence on catalyst activity. It is also important to note that Example 4, which used the same quantity of second Component B as Comparative Example 5, and which used half the amount of aluminum compared to Comparative Example 5, surprisingly resulted in a catalyst activity that was at least 4.5 times greater.

3. The Influence of Al(MAO)/M Molar Ratio

Comparative Examples 18 and 19 and Examples 15, 18, 20 and 21 were carried out to illustrate the influence of the molar ratio of Al(MAO), i.e., the first component of the cocatalyst, to the metallocene procatalyst has on the catalyst activity. Cogent results of these examples are summarized below in Table 4.

TABLE 4

COMPARATIVE EXAMPLES 18–19
EXAMPLES 15, 18 & 20–21

| COMP. EX./ EX. | PROCATALYST M | μmol M | mmol Al (Bu$^i$) | Al (Bu$^i$)/M | μmol Al (MAO) | Al (MAO)/M | BORATE TYPE | μmol | B/M | ACTIVITY kg/gZr/h |
|---|---|---|---|---|---|---|---|---|---|---|
| 18 | Ph$_2$Si(Cp-9-Flu)ZrCl$_2$ | 5.0 | 1.0 | 200 | 5000 | 1000 | — | — | — | 487 |
| 19 | Ph$_2$Si(Cp-9-Flu)ZrCl$_2$ | 5.0 | 1.0 | 200 | 2500 | 500 | — | — | — | 105 |
| 15 | Ph$_2$C(Cp-9-Flu)ZrCl$_2$ | 5.0 | — | — | 500 | 100 | AnB | 5.0 | 1 | 914 |
| 18 | Ph$_2$C(Cp-9-Flu)ZrCl$_2$ | 5.0 | — | — | 50 | 10 | AnB | 5.0 | 1 | 1349 |
| 20 | Ph$_2$Si(Cp-9-Flu)ZrCl$_2$ | 5.0 | — | — | 500 | 100 | AnB | 5.0 | 1 | 2546 |
| 21 | Ph$_2$Si(Cp-9-Flu)ZrCl$_2$ | 5.0 | — | — | 125 | 25 | AnB | 5.0 | 1 | 2733 |

As these data show, comparison of Example 15 with 18 and Example 20 with 21 unexpectedly demonstrate that when employing closely-related metallocene procatalysts activated by a cocatalyst in accordance with this invention there was an increase in catalyst activity as the molar ratio of Al(MAO)/M was decreased. By contrast, and in accordance with the expectations of one skilled in the art, Comparative Examples 18 and 19 demonstrate that when employing a cocatalyst outside the scope of this invention (for these examples a cocatalyst lacking the second component B), the catalyst activity decreased as the molar ratio of Al(MAO)/M was decreased. It was also surprising that the catalyst of Example 21, with a total aluminum content ⅛th of that of Comparative Example 19, exhibited a catalyst activity approximately 26 times greater.

4. The Influence of B/M Molar Ratio

Comparative Examples 20–22 and Examples 22–25 were carried out to illustrate the influence on catalyst activity of the molar ratio of B, the second component of the cocatalyst, to the metallocene procatalyst. The results of these examples are summarized below in Table 5.

Examples 22–25 demonstrate that when employing a cocatalyst in accordance with this invention, the optimal B/M ratio is in the range of 1 to 2 in order to achieve acceptable catalytic activity. Any B/M ratio not within the optimal range, i.e., either higher or lower than this range, resulted in a negative effect on the catalytic activity. By contrast, Comparative Examples 20–22 showed that the catalytic activity increased as the B/M ratio was increased with the B/M ratio serving only to increase the initial activity and not to extend the life of the catalyst.

5. The Equivalence of Various Components B

Comparative Examples 18 and 23–25 and Examples 24, 26 and 27 were carried out to determine the influence of the second component B of the cocatalyst on catalyst activity. The results are summarized below in Table 6.

TABLE 5

COMPARATIVE EXAMPLES 20–22
EXAMPLES 22–25

| COMP. EX./ EX. | PROCATALYST M | μmol M | mmol Al (Bu$^i$) | Al (Bu$^i$)/M | μmol Al (MAO) | Al (MAO)/M | BORATE TYPE | μmol | B/M | ACTIVITY kg/gZr/h |
|---|---|---|---|---|---|---|---|---|---|---|
| 20 | Ph$_2$Si(Cp-9-Flu)ZrCl$_2$ | 5.0 | 1.0 | 200 | — | — | AnB | 5.0 | 1 | 1037 |
| 21 | Ph$_2$Si(Cp-9-Flu)ZrCl$_2$ | 5.0 | 1.0 | 200 | — | — | AnB | 10.0 | 2 | 1271 |
| 22 | Ph$_2$Si(Cp-9-Flu)ZrCl$_2$ | 5.0 | 1.0 | 200 | — | — | AnB | 15.0 | 3 | 1476 |
| 22 | Ph$_2$Si(Cp-9-Flu)ZrCl$_2$ | 5.0 | 1.0 | 200 | 125 | 25 | AnB | 15.0 | 3 | 1418 |
| 23 | Ph$_2$Si(Cp-9-Flu)ZrCl$_2$ | 5.0 | 1.0 | 200 | 125 | 25 | AnB | 10.0 | 2 | 2142 |
| 24 | Ph$_2$Si(Cp-9-Flu)ZrCl$_2$ | 5.0 | 1.0 | 200 | 125 | 25 | AnB | 5.0 | 1 | 2515 |
| 25 | Ph$_2$Si(Cp-9-Flu)ZrCl$_2$ | 5.0 | 1.0 | 200 | 125 | 25 | AnB | 2.5 | 0.5 | 1209 |

TABLE 6

COMPARATIVE EXAMPLES 18 & 23–25
EXAMPLES 24 & 26–27

| COMP. EX./ EX. | PROCATALYST | μmol M | mmol Al (Bu$^i$) | Al (Bu$^i$)/M | μmol Al (MAO) | Al (MAO)/M | BORATE TYPE | μmol | B/M | ACTIVITY kg/gZr/h |
|---|---|---|---|---|---|---|---|---|---|---|
| 18 | Ph$_2$Si(Cp-9-Flu)ZrCl$_2$ | 5.0 | 1.0 | 200 | 5000 | 1000 | — | — | — | 487 |
| 23 | Ph$_2$Si(Cp-9-Flu)ZrCl$_2$ | 5.0 | 1.0 | 200 | — | — | AnB | 5.0 | 1.0 | 536 |
| 24 | Ph$_2$Si(Cp-9-Flu)ZrCl$_2$ | 5.0 | 1.0 | 200 | — | — | TriB | 5.0 | 1.0 | 501 |
| 25 | Ph$_2$Si(Cp-9-Flu)ZrCl$_2$ | 10.0 | 1.0 | 200 | — | — | LiB | 10.0 | 1.0 | 0 |
| 24 | Ph$_2$Si(Cp-9-Flu)ZrCl$_2$ | 5.0 | 1.0 | 200 | 125 | 125 | AnB | 5.0 | 1.0 | 2515 |
| 26 | Ph$_2$Si(Cp-9-Flu)ZrCl$_2$ | 5.0 | 1.0 | 200 | 125 | 125 | TriB | 5.0 | 1.0 | 1418 |
| 27 | Ph$_2$Si(Cp-9-Flu)ZrCl$_2$ | 5.0 | 1.0 | 200 | 125 | 125 | LiB | 5.0 | 1.0 | 884 |

Comparison of Examples 24, 26 and 27 to Comparative Example 18 illustrates that the use of different second component Bs in the cocatalyst of this invention will result in a greater enhancement in catalytic activity than a cocatalyst employing the first component MAO alone even when the Al(MAO)/M ratio for the Comparative Example is forty times higher.

Comparison of Examples 24, 26 and 27 to Comparative Examples 23–25, respectively, illustrates that a small amount of the first component MAO with different second component Bs of the cocatalyst in accordance with the invention will result in a substantial gain in catalytic activity relative to a cocatalyst employing the second component B alone. It was surprising that the catalytic activity was enhanced by the presence of LiB in the cocatalyst of this invention considering that when employed individually as in Comparative Example 25 it did not function as a cocatalyst.

6. Enhancement of Higher α-olefin Reactivity

Table 7 below summarizes the results from determining the influence of the cocatalyst on the incorporation of higher α-olefins in the copolymerization reactions.

TABLE 7

| EX./ COMP. EX. | PROCATALYST | μmol M | mmol Al (Bu$^i$) | Al (Bu$^i$)/M | μmol Al (MAO) | Al (MAO)/M | BORATE TYPE | μmol | B/M | E:P |
|---|---|---|---|---|---|---|---|---|---|---|
| Ex. 1 | Cp$_2$ZrCl$_2$ | 10.0 | 1.0 | 100 | 1000 | 100 | AnB | 10.0 | 1 | 75:25 |
| Comp. Ex. 1 | Cp$_2$ZrCl$_2$ | 10.0 | 1.0 | 100 | 10000 | 100 | — | — | — | 87:13 |
| Comp. Ex. 2 | Cp$_2$ZrCl$_2$ | 10.0 | 1.0 | 100 | — | — | AnB | 10.0 | 1 | 91:9 |
| Ex. 4 | Ind$_2$ZrMe$_2$ | 5.0 | — | — | 500 | 100 | AnB | 5.0 | 1 | 44:56 |
| Comp. Ex. 3 | Ind$_2$ZrMe$_2$ | 5.0 | 1.0 | 200 | 5000 | 1000 | — | — | — | 61:39 |
| Comp. Ex. 5 | Ind$_2$ZrMe$_2$ | 5.0 | 1.0 | 200 | — | — | AnB | 5.0 | 1 | 57:43 |
| Ex. 11 | Me$_2$Si(Cp)$_2$ZrCl$_2$ | 5.0 | 1.0 | 200 | 125 | 25 | AnB | 5.0 | 1 | 69:31 |
| Comp. Ex. 9 | Me$_2$Si(Cp)$_2$ZrCl$_2$ | 5.0 | 1.0 | 200 | — | — | AnB | 5.0 | 1 | 78:22 |
| Ex. 13 | Me$_2$Si(C$_5$Me$_2$)Bu$^t$N)TiCl$_2$ | 5.0 | 1.0 | 200 | 125 | 25 | AnB | 5.0 | 1 | 42:58 |
| Comp. Ex. 11 | Me$_2$Si(C$_5$Me$_2$)Bu$^t$N)TiCl$_2$ | 5.0 | 1.0 | 200 | 5000 | 1000 | — | — | — | 57:43 |
| Comp. Ex. 12 | Me$_2$Si(C$_5$Me$_2$)Bu$^t$N)TiCl$_2$ | 5.0 | 1.0 | 200 | — | — | AnB | 5.0 | 1 | 58:42 |
| Ex. 17 | Ph$_2$C(Cp-9-Flu)ZrCl$_2$ | 5.0 | — | — | 50 | 10 | AnB | 5.0 | 1 | 51:49 |
| Comp. Ex. 15 | Ph$_2$C(Cp-9-Flu)ZrCl$_2$ | 5.0 | 1.0 | 200 | — | — | AnB | 5.0 | 1 | 55:45 |
| Ex. 19 | Ph$_2$Si(Cp-9-Flu)ZrCl$_2$ | 5.0 | — | — | 500 | 10 | AnB | 5.0 | 1 | 49:51 |
| Comp. Ex. 17 | Ph$_2$Si(Cp-9-Flu)ZrCl$_2$ | 5.0 | 1.0 | 200 | 5000 | 1000 | — | — | — | 63:37 |

As these comparison data show, the cocatalyst in accordance with this invention resulted in a higher, and in certain instances substantially higher, incorporation of propylene in the copolymerization reactions employing different metallocene procatalysts. This result is all the more surprising considering one skilled in the art would expect the nature of the cocatalyst to influence the comonomer reactivity ratios but it was unexpected that the cocatalyst in accordance with this invention would exert such a profound influence.

7. Amelioration of Diene Inhibition of Catalyst Activity

Table 8 summarizes the influence of a diene comonomer on catalyst activity.

TABLE 8

| EX./COMP. EX. | PROCATALYST M | Al (MAO)/M | Al (Bu$^i$)/M | Borate | B/M | Diene | Activity | Δ Activ. (%)$^a$ | % Diene conv.$^b$ |
|---|---|---|---|---|---|---|---|---|---|
| Ex. 4 | Ind$_2$ZrMe$_2$ | 100 | — | AnB | 1 | — | 2733 | — | — |
| Ex. 6 | Ind$_2$ZrMe$_2$ | 100 | — | AnB | 1 | ENB | 1645 | −19 | 95 |
| Comp. Ex. 5 | Ind$_2$ZrMe$_2$ | — | 200 | AnB | 1 | — | 603 | — | — |
| Comp. Ex. 7 | Ind$_2$ZrMe$_2$ | — | 200 | AnB | 1 | ENB | 423 | −30 | 31 |
| Ex. 10 | rac-Et(Ind)$_2$ZrCl$_2$ | 25 | 200 | AnB | 1 | ENB | 5839 | — | 89 |
| Comp. Ex. 8 | rac-Et(Ind)$_2$ZrCl$_2$ | — | 200 | AnB | 1 | ENB | 2512 | — | 60 |
| Ex. 11 | Me$_2$Si(Cp)$_2$ZrCl$_2$ | 25 | 200 | AnB | 1 | — | 261 | — | — |
| Ex. 12 | Me$_2$Si(Cp)$_2$ZrCl$_2$ | 25 | 200 | AnB | 1 | ENB | 338 | +30 | 24 |
| Comp. Ex. 9 | Me$_2$Si(Cp)$_2$ZrCl$_2$ | — | 200 | AnB | 1 | — | 167 | — | — |
| Comp. Ex. 10 | Me$_2$Si(Cp)$_2$ZrCl$_2$ | — | 200 | AnB | 1 | ENB | — | −100 | — |
| Ex. 13 | Me$_2$Si(C$_5$Me$_4$)(Bu$^t$N)TiCl$_2$ | 25 | 200 | AnB | 1 | — | 1089 | — | — |
| Ex. 14 | Me$_2$Si(C$_5$Me$_4$)(Bu$^t$N)TiCl$_2$ | 25 | 200 | AnB | 1 | ENB | 1355 | +24 | 35 |
| Comp. Ex. 12 | Me$_2$Si(C$_5$Me$_4$)(Bu$^t$N)TiCl$_2$ | — | — | AnB | 1 | — | 911 | — | — |
| Comp. Ex. 13 | Me$_2$Si(C$_5$Me$_4$)(Bu$^t$N)TiCl$_2$ | — | — | AnB | 1 | ENB | 526 | −42 | 5 |
| Ex. 17 | Ph$_2$C(Cp-9-Flu)ZrCl$_2$ | 10 | — | AnB | 1 | — | 1240 | — | — |
| Ex. 16 | Ph$_2$C(Cp-9-Flu)ZrCl$_2$ | 25 | — | AnB | 1 | ENB | 898 | −27 | 62 |
| Ex. 18 | Ph$_2$C(Cp-9-Flu)ZrCl$_2$ | 10 | — | AnB | 1 | ENB | 1349 | +9 | 76 |
| Comp. Ex. 14 | Ph$_2$C(Cp-9-Flu)ZrCl$_2$ | 1000 | 200 | AnB | 1 | ENB | 572 | — | 31 |
| Comp. Ex. 15 | Ph$_2$C(Cp-9-Flu)ZrCl$_2$ | — | 200 | AnB | 1 | — | 980 | — | — |
| Comp. Ex. 16 | Ph$_2$C(Cp-9-Flu)ZrCl$_2$ | — | 200 | AnB | 1 | ENB | 606 | −38 | 40 |
| Ex. 19 | Ph$_2$Si(Cp-9-Flu)ZrCl$_2$ | 100 | — | AnB | 1 | — | 1846 | — | — |
| Ex. 20 | Ph$_2$Si(Cp-9-Flu)ZrCl$_2$ | 100 | — | AnB | 1 | ENB | 2546 | +38 | 99 |
| Ex. 21 | Ph$_2$Si(Cp-9-Flu)ZrCl$_2$ | 25 | — | AnB | 1 | ENB | 2733 | +48 | 99 |
| Ex. 24 | Ph$_2$Si(Cp-9-Flu)ZrCl$_2$ | 25 | — | AnB | 1 | DCPD | 2515 | +36 | 98 |
| Comp. Ex. 17 | Ph$_2$Si(Cp-9-Flu)ZrCl$_2$ | 1000 | 200 | — | — | — | 649 | — | — |
| Comp. Ex. 18 | Ph$_2$Si(Cp-9-Flu)ZrCl$_2$ | 1000 | 200 | — | — | ENB | 487 | −25 | 26 |
| Comp. Ex. 19 | Ph$_2$Si(Cp-9-Flu)ZrCl$_2$ | 500 | 200 | — | — | ENB | 105 | −78 | 6 |
| Comp. Ex. 20 | Ph$_2$Si(Cp-9-Flu)ZrCl$_2$ | — | 200 | AnB | 1 | ENB | 1037 | — | 63 |
| Comp. Ex. 23 | Ph$_2$Si(Cp-9-Flu)ZrCl$_2$ | — | 200 | AnB | 1 | DCPD | 536 | — | 28 |

$^a$Change in activity of polymerization in the presence of diene relative to that without diene.
$^b$Conversion of diene added to the reaction mixture. Since the same aliquot of diene was used in all terpolymerizations, the wt. % diene content in the polymer can be misleading where a high activity catalyst results in a high yield of polymer, with concomitant dilution of the diene content.

As these comparison data show, in the presence of a diene comonomer, the cocatalyst in accordance with this invention when activating different metallocene procatalysts resulted in a substantially higher conversion of the diene and substantially less inhibition of catalyst activity as compared to the cocatalyst outside the scope of this invention. The cocatalyst outside the scope of this invention also required a substantially longer time, i.e., 30–60 seconds, to initiate polymerization. The cocatalyst in accordance with this invention resulted in almost instantaneous initiation of polymerization. It was also surprising that at lower Al(MAO)/M ratio (Comparing Example 16 with 18 and Example 20 with 21) the catalyst in accordance with this invention unexpectedly resulted in a greater catalyst activity in the presence of diene.

8. Lowering of Glass Transition Temperature

Table 9 below summarizes the influence of a cocatalyst on the glass transition temperature.

TABLE 9

| Ex./Comp. Ex. | Procatalyst M | E:P | wt. % Diene | Tg (° C.) |
|---|---|---|---|---|
| Ex. 4 | Ind$_2$ZrMe$_2$ | 47:53 | — | −56 |
| Comp. Ex. 3 | Ind$_2$ZrMe$_2$ | 61:39 | — | −47 |
| Ex. 13 | Me$_2$Si (C$_5$Me$_4$) (Bu$^t$N)TiCl$_2$ | 42:58 | — | −51 |
| Comp. Ex. 11 | Me$_2$Si (C$_5$Me$_4$) (Bu$^t$N)TiCl$_2$ | 57:43 | — | −44 |
| Ex. 18 | Ph$_2$C (Cp-9-Flu) ZrCl$_2$ | 56:44 | 6.6 | −51 |
| Comp. Ex. 14 | Ph$_2$C (Cp-9-Flu) ZrCl$_2$ | 63:37 | 6.4 | −44 |
| Ex. 19 | Ph$_2$Si (Cp-9-Flu) ZrCl$_2$ | 49:51 | — | −57 |
| Comp. Ex. 17 | Ph$_2$Si (Cp-9-Flu) ZrCl$_2$ | 63:37 | — | −47 |

The glass transition temperature in EPDM-type polymers is influenced by the structure of the polymer, specifically by the composition and the nature of the distribution of the comonomers. As is well known among those skilled in the art, in amorphous EPDM-type polymers the glass transition temperature tends to increase with increasing propylene and diene content. As these data show, it was surprising that when using the cocatalyst outside the scope of this invention, the glass transition temperature increased as the propylene content was decreased relative to the cocatalyst used in accordance with this invention while employing the same metallocene procatalyst.

Also, as was noted in section 6, supra, while the copolymerization behavior of metallocene catalysts is known to be influenced by the ligand structure around the transition metal, those skilled in the art would not expect the cocatalyst to influence the distribution of comonomers.

9. Prevention of Gelation in Diene Copolymers

Table 1 also illustrates that a gelled polymer resulted in every case where the second component B was dimethylanilinium tetrakis (pentafluorophenyl) borate.

Unexpectedly, as shown in Table 2, the cocatalyst used in accordance with this invention, regardless of which second component B was employed, resulted in the production of no gelled polymers.

Comparative Examples 26–27

Employing the general solution polymerization procedure described above for the Comparative Examples of Table 1, several activated metallocene catalysts were utilized for the attempted preparation of EP and EPDM-type elastomers. The conditions of each polymerization and the properties of the resulting polymers are summarized below in Table 10.

TABLE 10

COMPARATIVE EXAMPLES 26–27

A. POLYMERIZATION CONDITIONS

| COMP. EX.* | PROCATALYST M | μmol M | T (° C.) | FEED E:P | DIENE TYPE | DIENE mL | Al (Bu$^i$) | μmol Al (MAO) | BORATE TYPE | BORATE μmol |
|---|---|---|---|---|---|---|---|---|---|---|
| 26 | Ph$_2$Si(Cp-9-Flu)ZrCl$_2$ | 5.0 | 40 | 1:1 | — | — | 500 | — | AnB | 5.0 |
| 27 | Ph$_2$Si(Cp-9-Flu)ZrCl$_2$ | 5.0 | 40 | 1:1 | ENB | 10.0 | 500 | 500 | AnB | 5.0 |

B. POLYMERIZATION RESULTS AND POLYMER PROPERTIES

| COMP. EX. | YIELD (g) | ACTIVITY kg/gZr/h | ML$_{1+4}$ (125° C.) | POLYMER E:P | DIENE (wt %) | COMMENT |
|---|---|---|---|---|---|---|
| 26 | 67 | 884 | 95 | 72:28 | — | High initial activity, rapid decay |
| 27 | 79 | 1045 | 102 | 65:35 | 10.1 | Sustained activity |

*All examples were carried out at 50 psi for 10 minutes.

Examples 28–31

The polymerization procedures used in these examples are similar to those employed in Examples 1–27 and are intended to show the beneficial effects of employing diisobutylaluminum tert-butoxide [DIBAOB], tetraisobutylaluminoxane [TIBAO] and combinations of these with MAO as the first component of the catalyst. The specific conditions of each polymerization and the physical properties of the resulting polymers are summarized below in Table 11.

and diis6butylaluminum-tert-butoxide (Example 30) produced catalysts that were both highly active and long-lived, with little or no loss in activity over the course of th polymerization reaction. The catalysts produced from the cocatalysts of Examples 28 and 30 also resulted in a catalyst activity that was approximately 40 percent higher than the catalyst activity of the catalyst produced in Comparative Example 26.

The catalysts used in accordance with this invention also yielded polymers with a substantially higher propylene

TABLE 11

EXAMPLES 28–31

A. POLYMERIZATION CONDITIONS

| EX.* | PROCATALYST M | μmol M | T (° C.) | FEED E:P | DIENE TYPE | DIENE mL | R—Al—O TYPE | R—Al—O μmol | μmol Al (MAO) | BORATE TYPE | BORATE μmol |
|---|---|---|---|---|---|---|---|---|---|---|---|
| 28 | Ph$_2$Si(Cp-9-Flu)ZrCl$_2$ | 5.0 | 40 | 1:1 | — | — | TIBAO | 500 | — | AnB | 5.0 |
| 29 | Ph$_2$Si(Cp-9-Flu)ZrCl$_2$ | 5.0 | 40 | 1:1 | ENB | 10.0 | TIBAO | 500 | 500 | AnB | 5.0 |
| 30 | Ph$_2$Si(Cp-9-Flu)ZrCl$_2$ | 5.0 | 40 | 1:1 | — | — | DIBAOB | 500 | — | AnB | 5.0 |
| 31 | Ph$_2$Si(Cp-9-Flu)ZrCl$_2$ | 5.0 | 40 | 1:1 | ENB | 10.0 | TIBAO | 500 | 500 | AnB | 5.0 |

B. POLYMERIZATION RESULTS AND POLYMER PROPERTIES

| COMP. EX. | YIELD (g) | ACTIVITY kg/gZr/h | ML$_{1+4}$ (125° C.) | POLYMER E:P | DIENE (wt %) | COMMENT |
|---|---|---|---|---|---|---|
| 28 | 95 | 1255 | 113 | 61:39 | — | Sustained activity |
| 29 | 110 | 1441 | 100 | 59:41 | 8.1 | Sustained activity |
| 30 | 93 | 1229 | 107 | 60:40 | — | Sustained activity |
| 31 | 115 | 1515 | 103 | 58:42 | 7.7 | Sustained activity |

*All examples were carried out at 50 psi for 10 minutes.

DISCUSSION OF COMPARATIVE EXAMPLES AND EXAMPLES

1. Comparison of Ethylene-propylene Copolymerization in the Absence of MAO

As these comparison data show, the cocatalyst outside the scope of this invention (Comparative Example 26) employing triisobutylaluminum and second component B produced a catalyst that displayed an extremely high initial activity followed by rapid decay. By contrast, the cocatalysts in accordance with the invention that replaced MAO as the first component with tetraisobutylaluminoxane (Example 28) and diisobutylaluminum-tert-butoxide (Example 30) procontent indicating an increase in the reactivity of propylene relative to ethylene.

2. Comparison of Ethylene-propylene-ENB Terpolymerizations in the Presence of MAO As these comparison data show, the cocatalyst in accordance with this invention employing a combination of MAO with tetraisobutylaluminoxane (Example 29) and diisobutylaluminum-tert-butoxide (Example 31) as the first component produced catalysts with approximately 40 percent higher catalytic activity and better propylene incorporation relative to the cocatalyst outside the scope of this invention (Comparative Example 27) that employed a combination of MAO with triisobutylaluminum. Examples 29 and 31 demonstrate that the combination of MAO with aluminoxy compounds unexpectedly enhance catalyst performance.

3. The Influence of Catalyst Preparation Conditions

The following methods were carried out when activating the metallocene procatalyst with the cocatalyst in accordance with this invention to illustrate the preferred method of catalyst preparation which exerts a profound influence on the properties of the resultant polymers.

Method I: All of the metallocene procatalyst, the aluminoxy compound, and the boron compound are tared under an inert atmosphere into an appropriate container, are diluted to the desired concentration with an inert solvent such as toluene and are allowed to react at room temperature for at least one hour prior to use.

Method II: The metallocene procatalyst and aluminoxy compound are combined as described above and the boron compound is prepared as a solution in an inert solvent such as toluene. The two solutions are then added separately to the reactor.

Method III: Two separate procatalyst solutions are prepared, one containing the metallocene procatalyst and a portion of the aluminoxy compound, the other containing the boron compound and the remainder of the aluminoxy compound. Both solutions are allowed to react at room temperature for one hour, and are then combined prior to addition to the reactor.

The following examples were carried out using the above-described methods. The results are summarized below in Table 12.

components-in a suitable solvent and mixed as described in Method I or II, supra. The solvent was then removed under vacuum yielding a glassy crystalline product. The catalyst product was pulverized via sonication to yield particles from about 5–30 microns in size. The powder was re-suspended in a non-solvent to yield a highly active catalyst slurry.

Supported Catalyst

The supported modification was prepared by dissolving the metallocene component along with the cocatalyst components in a suitable solvent and mixed as described in Method I or III, supra. An appropriate amount of MAO-treated silica gel was added to the catalyst solution and stirred for 5 hours. The solvent was removed under vacuum, yielding the catalyst as a fine powder. The silica supported catalyst was re-suspended in hydrocarbon medium to yield a highly active catalyst slurry. The catalyst was then suitable for utilization in either a solution, slurry, or gas-phase polymerization of olefins.

What is claimed is:

1. A process for the polymerization or copolymerization of at least one α-olefin and, optionally, at least one diene monomer, to obtain an elastomer, the process comprising polymerizing the at least one α-olefin in the presence of a catalytically effective amount of catalyst comprising the product obtained by combining a metallocene procatalyst containing a transition metal with a cocatalyst, the cocatalyst comprising at least one organometallic or organometalloid first component containing at least one compound of the general formula

R—Al—O

TABLE 12

EXAMPLES 32–37

| | | Solution 1 | | Solution 2 | | | | | | | | |
|---|---|---|---|---|---|---|---|---|---|---|---|---|
| Ex.[1] | Method | MAO/Zr[2] | MAO/B[2] | MAO/B[2] | Diene Type[3] | Diene ml | Yield g | Activity kg/gZr/h | Mw/Mn | ML$_{1+4}$ (125° C.) | Poly. E:P | Diene (wt. %) |
| 32 | I | 100 | 100 | — | — | — | 104 | 2729 | 1.94 | 76 | 53:47 | — |
| 33 | III | 25 | — | 75 | — | — | 111 | 2915 | 5.32 | 41 | 55:45 | — |
| 34 | III | 50 | — | 50 | — | — | 106 | 2791 | 4.49 | 48 | 56:44 | — |
| 35 | III | 75 | — | 25 | — | — | 113 | 2978 | 3.82 | 55 | 52:48 | — |
| 36 | I | 100 | 100 | — | DCPD | 10.0 | 89 | 2353 | 2.01 | 122 | 62:38 | 10.2 |
| 37 | III | 25 | — | 75 | DCPD | 10.0 | 101 | 2667 | 5.41 | 55 | 63:39 | 9.0 |

As these comparison data show, the two methods of catalyst preparation yielded catalysts that were essentially identical with respect to catalyst activity and reactivity towards propylene and diene. However, Method III, where the metallocene procatalyst and second component are reacted separately with the aluminoxy compound, allows for the Mooney viscosity and the molecular weight distribution of the polymer to be controlled via the molar ratio of A:B.

Heterogeneous Modifications of the Catalysts

The catalyst/cocatalyst system in accordance with this invention can also be prepared in two heterogeneous modifications: unsupported and supported. The modifications are described below:

Unsupported Catalyst

The unsupported modification was prepared by dissolving the metallocene component along with the cocatalyst wherein R is a hydrocarbyl group of from 1 to about 30 carbon atoms; and a neutral or ionic metal- and/or metalloid-containing second component having at least one aryl group possessing at least one electron-withdrawing substituent, it being provided that the molar ratio of the first component to the transition metal is from 1 to about 10,000 and the molar ratio of the second component to the transition metal is from 0.01 to about 14.

2. The process of claim 1 wherein the metallocene procatalyst is selected from the group consisting of zirconocene dichloride, dimethylbis(indenyl) zirconium, racemic-ethylenebis(indenyl) zirconium dichloride, dimethylsilyl bis (cyclopentadienyl) zirconium dichloride, dimethylsilyl (tetramethylcyclopentadienyl)(tert-butylamido) titanium dichloride, diphenylmethylene (cyclopentadienyl-9-fluorenyl)zirconium dichloride and diphenylsilyl (cyclopentadienyl-9-fluorenyl)zirconium dichloride.

3. The process of claim 1 wherein in the cocatalyst, the first component is selected from the group consisting of alkylaluminum alkoxide, siloxalane, dimeric aluminoxane and oligomeric aluminoxane.

4. The process of claim 3 wherein the alkylaluminum alkoxide is diisobutylaluminum-tert-butoxide.

5. The process of claim 3 wherein the siloxalane is diethylaluminum trimethylsiloxane.

6. The process of claim 3 wherein the dimeric aluminoxane is tetraisobutylaluminoxane.

7. The process of claim 3 wherein the oligomeric aluminoxane is methylaluminoxane.

8. The process of claim 1 wherein in the cocatalyst, the second component is selected from the group consisting of perfluoroarylborane compounds and salts thereof.

9. The process of claim 8 wherein the perfluoroarylborane compound is tris(pentafluorophenyl)-borane.

10. The process of claim 8 wherein the salt of the perfluoroarylborane compound is selected form the group consisting of dimethylanilinium tetrakis (pentafluorophenyl)borate, trityl tetrakis (pentafluorophenyl)borate and lithium tetrakis (pentafluorophenyl)borate.

11. The process of claim 1 wherein in the cocatalyst, the first component is selected from the group consisting of diisobutylaluminum-tert-butoxide, tetraisobutylaluminoxane and methylaluminoxane and the second component is selected from the group consisting of dimethylanilinium tetrakis (pentafluorophenyl)borate, trityl tetrakis (pentafluorophenyl) borate and lithium tetrakis (pentafluorophenyl)borate.

12. The process of claim 1 wherein the molar ratio of the first component of the cocatalyst to the transition metal is from about 10 to about 1,000.

13. The process of claim 1 wherein the molar ratio of the second component of the cocatalyst to the transition metal is from about 0.2 to about 10.

14. The process of claim 1 wherein the metallocene procatalyst is combined with the components of the cocatalyst in any combination or in any order thereof.

15. The process of claim 11 wherein the metallocene procatalyst is combined with the components of the cocatalyst in any combination or in any order thereof.

16. The process of claim 1 wherein the metallocene procatalyst is first combined with at least a portion of the first component of the cocatalyst and thereafter combined with the product comprising the reaction of the second component with the remaining portion of the first component.

17. The process of claim 1 wherein the cocatalyst further comprises a third component.

18. The process of claim 17 wherein the third component is a trialkylaluminum.

19. The process of claim 18 wherein the trialkylaluminum is selected from the group consisting of trimethylaluminum, triethylaluminum, tri(n-propyl)aluminum, triisopropylaluminum, tri(n-butyl)aluminum, triisobutylaluminum tri(n-hexyl)aluminum and tri(n-octyl)aluminum.

20. The process of claim 18 wherein the molar ratio of the third component to the transition metal is from 0 to about 1,000.

21. The process of claim 1 wherein the catalyst further comprises a support material.

22. The process of claim 21 wherein the support material is an inorganic solid porous support.

23. The process of claim 22 wherein the inorganic solid porous support is selected from the group consisting of talc, silica, alumina, silica-alumina and mixtures thereof.

24. The process of claim 1 wherein the α-olefin contains from 2 to about 20 carbon atoms and the diene, where present, is a conjugated or nonconjugated, acyclic or cyclic, diene.

25. The process of claim 1 wherein the α-olefin is selected from the group consisting of ethylene and propylene.

26. The process of claim 1 wherein polymerization is carried out under solution polymerization conditions.

27. The process of claim 1 wherein polymerization is carried out under slurry polymerization conditions.

28. The process of claim 1 wherein the elastomer possesses an $M_w$ of from about 70,000 to about 2,000,000, an $ML_{1+4}$ at 125° C. of from about 10 to about 200, an $M_w/M_n$ of from about 1.5 to about 10 and a $T_g$ of below about –40° C.

29. The process of claim 1 wherein the elastomer possesses an $M_w$ of from about 250,000 to about 1,750,000, an $ML_{1+4}$ at 125° C. of from about 15 to about 150, an $M_w/M_n$ of from about 2.0 to about 7.5 and a $T_g$ of about –40° C.

30. A process for the improved initiation of polymerization of at least one'α-olefin and, optionally, at least one diene monomer, to obtain an elastomer, the process comprising polymerizing the at least one α-olefin in the presence of a catalytically effective amount of catalyst comprising the product obtained by combining metallocene procatalyst containing a transition metal with a cocatalyst, the cocatalyst comprising at least one organometallic or organometalloid first component containing at least one compound of the general formula

wherein R is a hydrocarbyl group of from 1 to about 30 carbon atoms; and a neutral or ionic metal- and/or metalloid-containing second component having at least one aryl group possessing at least one electron-withdrawing substituent, it being provided that the molar ratio of the first component to the transition metal is from 1 to about 10,000 and the molar ratio of the second component to the transition metal is from 0.01 to about 14.

31. The process of claim 30 wherein the metallocene procatalyst is selected from the group consisting of zirconocene dichloride, dimethylbis(indenyl) zirconium, racemic-ethylenebis(indenyl) zirconium dichloride, dimethylsilyl bis(cyclopentadienyl) zirconium dichloride, dimethylsilyl(tetramethylcyclopentadienyl)(tert-butylamido) titanium dichloride, diphenylmethylene (cyclopentadienyl-9-fluorenyl)zirconium dichloride and diphenylsilyl(cyclopentadienyl-9-fluorenyl)zirconium dichloride.

32. The process of claim 30 wherein in the cocatalyst, the first component is selected from the group consisting of alkylaluminum alkoxide, siloxalane, dimeric aluminoxane and oligomeric aluminoxane.

33. The process of claim 30 wherein in the cocatalyst, the second component is selected from the group consisting of perfluoroarylborane compounds and salts thereof.

34. The process of claim 30 wherein in the cocatalyst, the first component is selected from the group consisting of diisobutylaluminum-tert-butoxide, tetraisobutylaluminoxane and methylaluminoxane and the second component is selected from the group consisting of dimethylanilinium tetrakis (pentafluorophenyl)borate, trityl tetrakis (pentafluorophenyl) borate and lithium tetrakis (pentafluorophenyl)borate.

35. The process of claim 30 wherein the metallocene procatalyst is combined with the components of the cocatalyst in any combination or in any order thereof in the absence of olefin.

36. The process of claim 30 wherein the metallocene procatalyst is combined with the components of the cocatalyst in any combination or in any order thereof in the presence of olefin.

* * * * *